United States Patent [19]
Kimura et al.

[11] Patent Number: 5,401,219
[45] Date of Patent: Mar. 28, 1995

[54] OIL PRESSURE CONTROL SYSTEM FOR AUTOMATIC TRANSMISSION

[75] Inventors: Hiromichi Kimura, Okazaki; Hidehiro Oba, Aichi; Kunihiro Iwatsuki, Toyota; Yoshihisa Yamamoto, Nishio; Masahiko Ando, Okazaki; Masahiro Hayabuchi, Anjo, all of Japan

[73] Assignees: Toyota Jidosha Kabushiki Kaisha, Toyota; Aisin AW Co., Ltd., Anjo, both of Japan

[21] Appl. No.: 31,827

[22] Filed: Mar. 16, 1993

[30] Foreign Application Priority Data

Mar. 16, 1992 [JP] Japan ................... 4-058176

[51] Int. Cl.$^6$ .............................................. F16H 61/06
[52] U.S. Cl. ................... 475/120; 477/148; 477/149
[58] Field of Search ............... 74/335, 336 R, 866, 74/867, 868; 475/116, 120, 121; 364/424.1

[56] References Cited

U.S. PATENT DOCUMENTS

| | | |
|---|---|---|
| 4,653,351 | 3/1987 | Downs et al. . |
| 4,930,078 | 5/1990 | Dunkley et al. ........... 364/424.1 OR |
| 4,930,081 | 5/1990 | Dunkley et al. ........... 364/424.1 OR |
| 4,989,477 | 2/1991 | Hunter et al. . |
| 5,029,494 | 7/1991 | Lentz et al. . |
| 5,046,174 | 9/1991 | Lentz et al. . |
| 5,070,747 | 12/1991 | Lentz et al. . |
| 5,079,970 | 1/1992 | Butts et al. . |
| 5,095,434 | 3/1992 | Lupo et al. ........................ 74/866 X |
| 5,133,231 | 7/1992 | Goto et al. ..................... 74/867 OR |
| 5,140,871 | 8/1992 | Goto et al. ..................... 74/866 OR |
| 5,168,777 | 12/1992 | Isono et al. ..................... 74/866 OR |

FOREIGN PATENT DOCUMENTS

1295060 12/1989 Japan .

Primary Examiner—Dirk Wright
Attorney, Agent, or Firm—Oblon, Spivak, McClelland, Maier, & Neustadt

[57] ABSTRACT

An oil pressure control system for an automatic transmission for executing a downshift by disengaging a first frictional engagement element and engaging a second frictional engagement element. At a latter stage of a shift, the first frictional engagement element has its torque capacity increased by raising its oil pressure temporarily. After this, if a synchronization substantially reaching the revolution number at a gear stage after the downshift is detected, the first frictional engagement element has its torque capacity gradually dropped by dropping the oil pressure thereof gradually, and the second frictional engagement element has its oil pressure abruptly raised.

4 Claims, 5 Drawing Sheets

FIG. 3

| | C0 | C1 | C2 | B0 | B1 | B2 | B3 | B4 | F0 | F1 | F2 | AUX. | MAIN | GEAR RATIO |
|---|---|---|---|---|---|---|---|---|---|---|---|---|---|---|
| N | ○ | | | ◌ | | | | | | | | — | — | — |
| REV | | ○ | ○ | ○ | | | | ○ | | | | HIGH | REV | 3.488 |
| 1ST | | ○ | | | | | | ● | ○ | | ○ | LOW | 1ST SPEED | 3.357 |
| 1.5TH | | ○ | | ○ | | | | ● | | | ○ | HIGH | 1ST SPEED | 2.527 |
| 2ND | ● | ○ | | | | | ○ | | ○ | | | LOW | 2ND SPEED | 2.208 |
| 2.5TH | ○ | ○ | | ○ | | | ○ | | | | | HIGH | 2ND SPEED | 1.663 |
| 3RD | | ○ | | | ● | ○ | | | ○ | ○ | | LOW | 3RD SPEED | 1.418 |
| 3.5TH | | ○ | | ○ | ● | ○ | | | | ○ | | HIGH | 3RD SPEED | 1.067 |
| 4TH | ○ | ○ | ○ | | | | | | ○ | | | LOW | 4TH SPEED | 1.000 |
| 4.5TH (5TH) | | ○ | ○ | ○ | | | | | | | | HIGH | 4TH SPEED | 0.753 |

OIL PRESSURE CONTROL SYSTEM FOR AUTOMATIC TRANSMISSION

BACKGROUND OF THE INVENTION

1. Field of the Invention

The present invention relates to a system for controlling the oil pressure of a frictional engagement element in a vehicular automatic transmission and, more particularly, to a system for controlling the oil pressure of a frictional engagement element participating in a downshift.

2. Description of the Prior Art

A particular shift of an automatic transmission may be executed by disengaging one frictional engagement element and engaging another frictional engagement element. This shifting mode is known as the so-called "clutch-to-clutch shift". For this shift, it is necessary to take a proper synchronization between the engagement and disengagement of each of the frictional engagement elements.

If the engagement and disengagement of those frictional engagement elements should go out of timing, it may occur that the output shaft torque temporarily drops or that the engine is encountered by the blow-up, in which its revolution number abruptly increases for a while.

For this control, therefore, it is generally the current practice of the prior art that a one-way clutch for performing a function substantially similar to that of one of the frictional engagement elements is provided to effect the synchronization between the engagement and disengagement of the frictional engagement elements.

Since, however, the one-way clutch is limited in the direction to transmit the torque, nondirectional frictional engagement elements such as multi-disc clutches or brakes have to be additionally arranged in parallel with that one-way clutch. This necessity for the one-way clutch causes problems such as a rise of the production cost or an increase in the weight or the required space.

In recent years, various sensor technologies or electronic control technologies for the oil pressure control system have made remarkable progress. Trials for executing the clutch-to-clutch shift directly by using not any one-way clutch but those technologies are activated again.

In case a downshift is to be executed by resorting to the clutch-to-clutch shift, it is important to time the engagement a frictional engagement element at a lower gear stage after the downshift. Specifically, the frictional engagement element at the lower gear stage has to be engaged without fail at the instant when the rotations of predetermined rotary members are synchronized by disengaging the frictional engagement element which was engaged at a higher gear stage before the downshift. This technology for executing the downshift satisfactorily is disclosed in Japanese Patent Laid-Open No. 295060/1989. According to the technology disclosed in the Laid-Open, the synchronization between predetermined rotary members at a shifting time is decided on the basis of the input and output revolution numbers of an automatic transmission, and the oil pressure of a frictional engagement element to engage at a lower gear stage is abruptly raised after the synchronization has been decided.

Since, however, the oil pressure control system has inevitable response delays or dispersions, it is the current practice that the aforementioned control technology finds it actually difficult to engage the frictional engagement element at the lower gear stage without fail at the instant of the synchronization and that the engagement is liable to go out of timing. Moreover, the output shaft torque abruptly drops if the engagement of the frictional engagement element at the lower gear stage is timed premature, but the engine blows up if the engagement is timed late.

SUMMARY OF THE INVENTION

A main object of the present invention is to control a downshift of the so-called "clutch-to-clutch shift" more properly.

Another object of the present invention is to prevent both an abrupt drop and an engine blow-up at the time of a downshift of the clutch-to-clutch shift.

Still another object of the present invention is to optimize the timing of the engagement of a frictional engagement element at the time of a downshift by temporarily raising the oil pressure of a frictional engagement element to be disengaged at the time of the downshift.

According to the present invention, there is provided an oil pressure control system which comprises: oil pressure raise means for raising the oil pressure of a first frictional engagement element gradually and increasing the rising rate of the oil pressure of a second frictional engagement element when a predetermined first condition is satisfied after a downshift has been started by dropping the oil pressure of the first frictional engagement element and by raising the oil pressure of the second frictional engagement element; and second oil pressure control means for decreasing the oil pressure of the first frictional engagement element gradually and further increasing the rising rate of the oil pressure of the second frictional engagement element when a second condition is satisfied. The above-specified first condition means an arrival at the latter stage of the downshift and can be decided from the fact that an input R.P.M. approaches the value, which is computed by multiplying an output R.P.M. by a gear ratio after the downshift, within a predetermined range. On the other hand, the above-specified second condition means that the revolution number of the rotary members of an automatic transmission comes to a synchronized one at the gear stage after the downshift. The second condition can be decided from the fact that the difference between the input R.P.M. and the revolution number computed by multiplying the output R.P.M. by the gear ratio after the downshift.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 3 is a chart presenting the applications of individual frictional engagement elements for setting individual gear stages;

DETAILED DESCRIPTION OF THE PREFERRED EMBODIMENT

Figure 1:
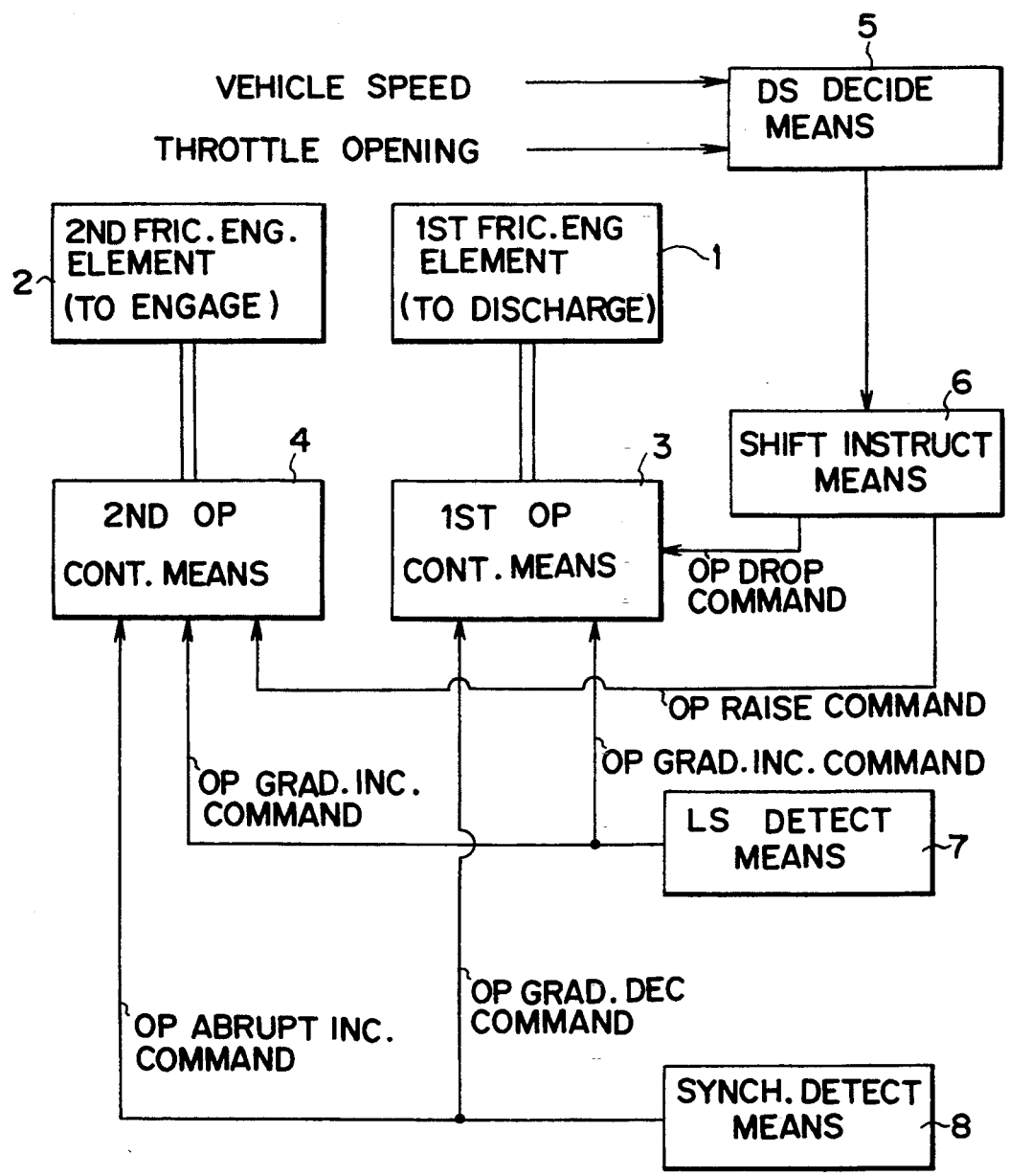
FIG. 1 is a block diagram showing one embodiment of the present invention functionally.

FIG. 1 is a block diagram showing one embodiment of the oil pressure control system of the present invention with functional means. This oil pressure control system controls the oil pressures (OP) of a first frictional engagement element 1 and a second frictional engagement element 2, which are to be respectively disengaged and engaged at the time of a downshift (DS) from a predetermined gear stage to another. The oil pressure control system comprises: first oil pressure control means 3 for controlling the oil pressure of the first frictional engagement element 1 on the basis of an input signal; second oil pressure control means 4 for controlling the oil pressure of the second frictional engagement element 2 on the basis of an input signal; downshift decide means 5 for deciding that the downshift should be executed; shift command means 6 for outputting a command for dropping the oil pressure of the first frictional engagement element 1 to the first oil pressure control means 3 and a command for raising the oil pressure of the second frictional engagement element 2 to the second oil pressure control means 4, if it is decided that the down shift should be decided; latter shift stage detect means 7 for detecting the shift latter stage (LS) of the downshift from the drop of the oil pressure of the first frictional engagement element 1 to output individual oil pressure raising commands to the oil pressure control means 3 and 4; and synchronism detect means 8 for detecting the rotational synchronism between predetermined rotary members to output an oil pressure gradual decrease command to the first oil pressure control means 3 and an oil pressure abrupt increase command to the second oil pressure control means 4.

When a downshift is decided in the oil pressure control system shown in FIG. 1, the first frictional engagement element 1 has its oil pressure dropped at first to start its slip, and the second frictional engagement element 2 has its oil pressure raised to start the shift. When the latter stage of the downshift is then detected, the oil pressure of the first frictional engagement element 1 is gradually increased to the contrary. Simultaneously with this, the increasing rate of the oil pressure of the second frictional engagement element 2 is augmented.

As a result, the torque to be transmitted to the second frictional engagement element 2 is gradually increased at the latter shift stage thereby to prevent an abrupt drop of the output shaft torque. On the other hand, the torque capacity of the second frictional engagement element 2 is compensated to establish a situation in which the second frictional engagement element 2 can be completely engaged simultaneously as the rotational synchronization is detected.

If the rotational synchronization is detected in this state, the oil pressure of the second frictional engagement element 2 is abruptly increased, whereas the oil pressure of the first frictional engagement element 1 is gradually dropped. As a result, the downshift of the so-called clutch-to-clutch shift is reliably executed with inviting neither any abrupt rise or overrun of the engine r.p.m. nor any drop of the output shaft torque.

Since the first frictional engagement element 1 has a torque capacity at the instant when the rotational synchronization is detected, the second frictional engagement element 2 has its load torque decreased, and the frictional engagement elements have a tendency to be faster engaged than disengaged. As a result, the engine may raise its r.p.m. abruptly or may run over if the first frictional engagement element 1 is abruptly disengaged. Thus, in the system of the present invention, the oil pressure of the first frictional engagement element 1 is gradually dropped when the rotational synchronism is detected.

Figure 2:
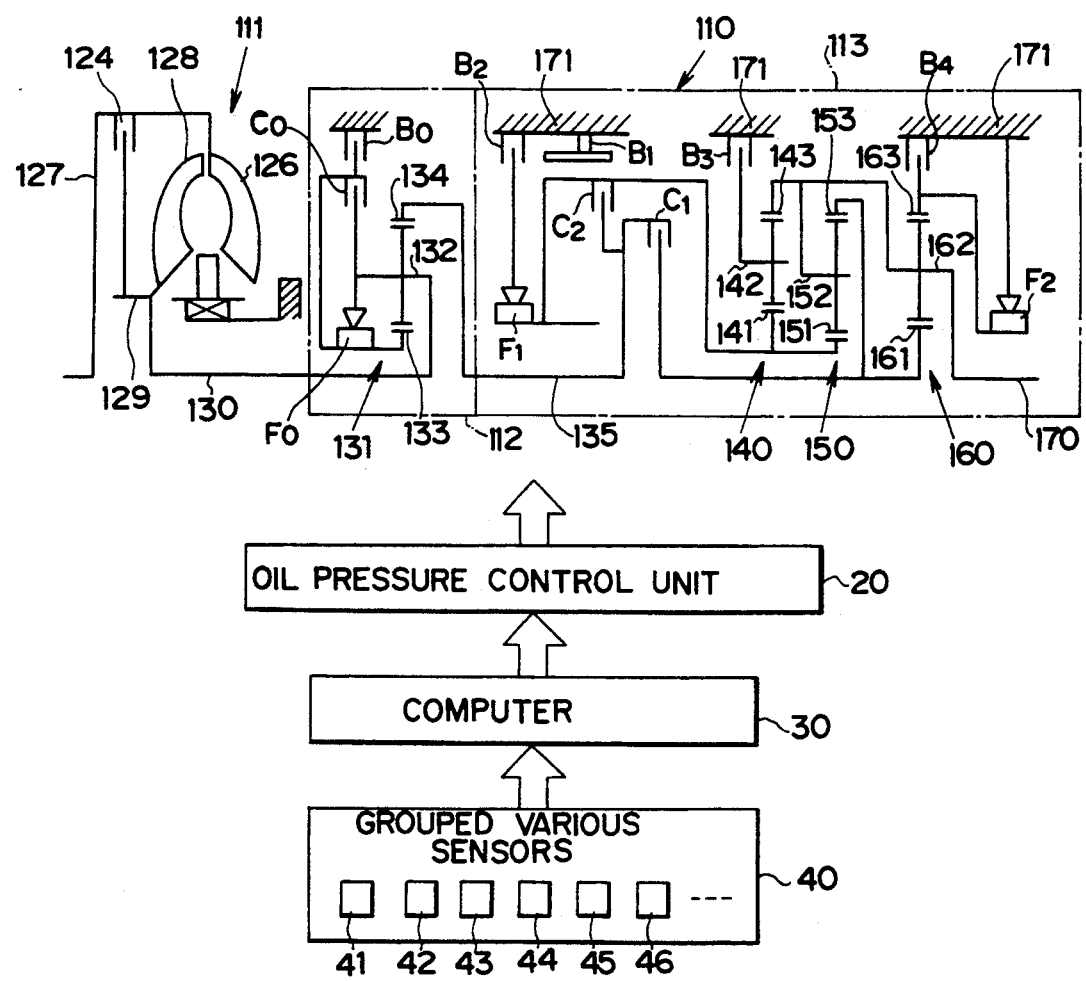
FIG. 2 is a schematic diagram showing an automatic transmission equipped with an oil pressure control system according to the present invention.

A more specific embodiment of the present invention will be described in the following with reference to FIGS. 2 to 5. In FIG. 2, an automatic transmission 110 is constructed to include a torque converter 111, an auxiliary transmission unit 112 and a main transmission unit 113.

The torque converter 111 is equipped with a lockup clutch 124. This lockup clutch 124 is interposed between a front cover 127 integrated with a pump impeller 126 and a member (e.g., hub) 129 integrated with a turbine runner 128.

The engine has its crankshaft (although neither of them are shown) connected to the front cover 127. An input shaft 130 connected to the turbine runner 128 is further connected with a carrier 132 of an overdrive planetary gear mechanism 131 constituting the auxiliary transmission unit 112.

Between the carrier 132 and a sun gear 133 of the planetary gear mechanism 131, there are interposed a clutch $C_o$ and a one-way clutch $F_o$. This one-way clutch $F_o$ is engaged if the sun gear 133 rotates forward (i.e., in the direction of rotation of the input shaft 130) with respect to the carrier 132.

On the other hand, there is provided a brake $B_o$ for stopping the rotation of the sun gear 133 selectively A ring gear 134 acting as an output element of the auxiliary transmission unit 112 is connected to an intermediate shaft 135 acting as an input element of the main transmission unit 113.

In the auxiliary transmission unit 112, the planetary gear mechanism 131 rotates in its entirety with the clutch $C_o$ or the one-way clutch $F_o$ being engaged, so that the intermediate shaft 135 rotates at the same speed as the input shaft 130. With the brake $B_o$ being engaged to stop the rotation of the sun gear 133, on the other hand, the ring gear 134 is accelerated forward with respect to the input shaft 130. In short, the auxiliary transmission unit 112 can be switched between two high and low stages.

The aforementioned main transmission unit 113 is equipped with three sets of planetary gear mechanisms 140, 150 and 160, which are connected in the following manner.

Specifically, the sun gear 141 of the first planetary gear mechanism 140 and the sun gear 151 of the second planetary gear mechanism 150 are connected to each other. The ring gear 143 of the first planetary gear mechanism 140, the carrier 152 of the second planetary gear mechanism 150 and the carrier 162 of the third planetary gear mechanism 160 are connected to one another. An output shaft 170 is connected to the carrier 162 of the third planetary gear mechanism 160. The ring gear 153 of the second planetary gear mechanism 150 is connected to the sun gear 161 of the third planetary gear mechanism 160.

The gear train of the main transmission unit 113 can set one reverse gear stage and four forward gear stages and is provided with the following clutches and brakes for the setting.

Specifically, a clutch $C_1$ is interposed between the ring gear 153 of the second planetary gear mechanism 150 and the sun gear 161 of the third planetary gear mechanism 160, and the intermediate gear 135. A clutch $C_2$ is interposed between the sun gear 141 of the first planetary gear mechanism 140 and the sun gear 151 of the second planetary gear mechanism 150, and the intermediate shaft 135.

A brake $B_1$ is arranged for stopping the rotations of the sun gears 141 and 151 of the first planetary gear mechanism 140 and the second planetary gear mechanism 150. A one-way clutch $F_1$ and a brake $B_2$ are arranged in series between those sun gears 141 and 151 and a casing 171. The one-way clutch $F_1$ is engaged when the sun gears 141 and 151 are to rotate backward (i.e., in the direction opposite to that of the input shaft 130).

A brake $B_3$ is interposed between the carrier 142 of the first planetary gear mechanism 140 and the casing 171. A brake $B_4$ and a one-way clutch $F_2$ acting as elements for stopping the rotation of the ring gear 163 of the third planetary gear mechanism 160 are arranged in parallel between the ring gear 163 and the casing 171. Here, the one-way clutch $F_2$ is engaged when the ring gear 163 is to rotate backward.

Figure 4:
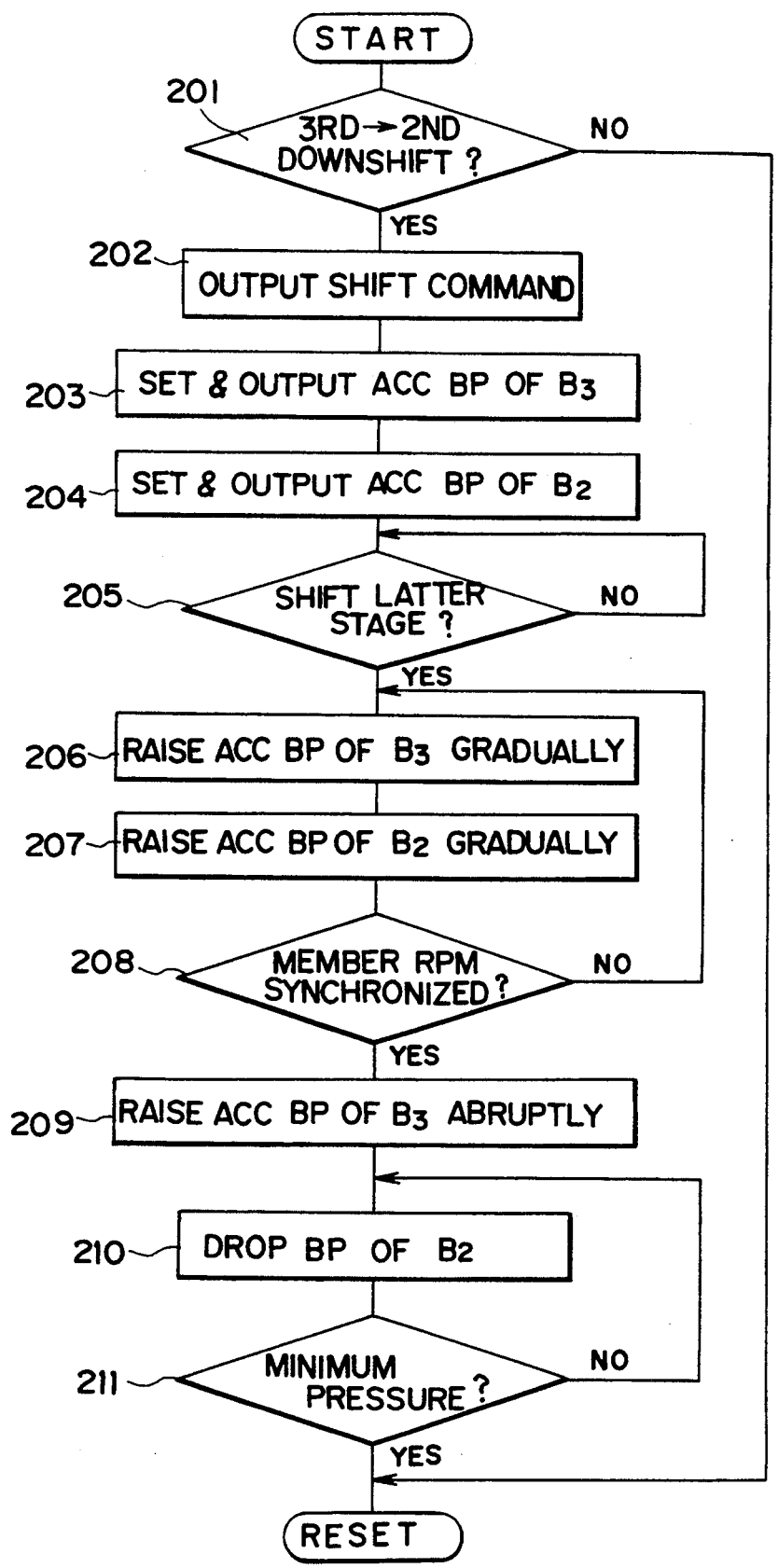
FIG. 4 is a flow chart showing an oil pressure control routine the time of a downshift for the clutch-to-clutch shift.

The automatic transmission 110 thus constructed can effect a shifting operation of one reverse and eight forward stages as a whole because the auxiliary transmission unit 112 can change the two high and low stages whereas the main transmission unit 113 can change the four forward stages. The chart for engaging and disengaging the individual clutches and brakes so as to set those gear stages is presented in FIG. 4. In FIG. 4: symbols ◯ indicate the engaged states to be taken; symbols ● indicate the engaged states to be taken at the time of engine braking; and blanks indicate the disengaged states.

In this embodiment, however, only the five forward stages of 1st, 2nd, 3rd, 4th and 5th speeds are used as the forward stages.

It is apparently seen from the chart that the downshift from the 3rd to 2nd speeds is effected through the clutch-to-clutch shift by disengaging the brake $B_2$ (corresponding to a high-gear clutch) and by engaging the brake $B_3$ (corresponding to a low-gear clutch).

The engagements and/or disengagements of the individual clutches and brakes are executed by driving electromagnetic valves or linear solenoid valves in an oil pressure control unit 20 on the basis of commands coming from a computer 30. This computer 30 is made receptive of not only fundamental signals coming from grouped various sensors 40, such as a vehicle speed signal (indicating an output shaft revolution number $N_o$) from a vehicle speed sensor 41, a throttle opening signal (indicating an accelerator opening) from a throttle sensor 42, a pattern select signal (i.e., a select signal for selecting a power run or an economy run selected by the driver) from a pattern select switch 43, a shift position signal from a shift position switch 44 or a foot brake signal from a brake switch 45, but also a rotational speed signal (indicating the revolution number of the clutch $C_o$) from a $C_o$ sensor 46.

Incidentally, the oil pressure controls per se for disengaging the brake $B_2$ and for engaging the brake $B_3$ are well known in the art in connection with their various methods, and their detailed description will be omitted. Basically, in connection with both the brakes $B_2$ and $B_3$, the back pressures of accumulators disposed in the oil passages of the brakes may be controlled by accumulator control valves and linear solenoid valves. In connection with the disengagement of the brake $B_2$, on the other hand, the drainage through the oil pressure circuit of the brake $B_2$ may be controlled by the linear solenoid valve because the control included is one for dropping the oil pressure.

Here, the individual linear solenoid valves are driven under the control of the computer 30. FIG. 4 shows a control flow to be executed by the computer 30.

First of all, at Step 201, it is decided whether or not a downshift from the 3rd to 2nd speeds is taking place. This decision is accomplished in view of the map between the throttle opening and the vehicle speed by deciding whether or not a downshift curve from the 3rd to 2nd speeds is crossed by the running state at present. Without this decision of the shift from the 3rd to 2nd speeds, the routine advances as it is to RESET to effect none of the controls.

At Step 202, the shift command is outputted on the basis of that shift decision. Specifically, the not-shown shift valves are switched by the solenoid valves driven in response to the command from the computer 30 so that the brake $B_2$ is disengaged whereas the brake $B_3$ is engaged.

As a result, the oil flows are started. In this embodiment, the oil flows, i.e., the transient characteristics of the drop of the oil pressure of the brake $B_2$ and the rise of the oil pressure of the brake $B_3$ are properly controlled in the routine on and after Step 203.

The accumulator back pressure of the brake $B_3$ is set and outputted at Step 203. Specifically, the accumulator back pressure of the brake $B_3$ is set at such a low level as to suppress the rise of the oil pressure of the brake $B_3$ after the shift has been instructed.

At Step 204, on the other hand, the accumulator back pressure of the brake $B_2$ is set and outputted. Specifically, the accumulator back pressure of the brake $B_2$ is set to such a low level that the oil pressure of the brake $B_2$ drops at a predetermined rate until the brake $B_2$ starts to slip.

As a result, it is decided at Step 205 whether or not the latter shift stage is reached. This decision is accomplished by deciding whether or not the a turbine revolution number $N_t$ (= the revolution number of the clutch $C_o$) exceeds the value which is computed by subtracting a predetermined value $\Delta N_{t1}$ from the value of an output shaft revolution number $N_o$ by a gear ratio $i_2$ of the 2nd speed. When the brake $B_2$ starts to slip as the oil pressure of the brake $B_2$ drops, the turbine revolution speed $N_t$ starts to increase toward the synchronized revolution number ($= N_o \times i_2$) at the 2nd speed. The entrance of the shift to the latter stage can be decided by detecting that the turbine revolution number $N_t$ has exceeded the value which is computed by subtracting the predetermined value $\Delta N_{t1}$ from the synchronized revolution number. Incidentally, the flow is substantially interrupted till the decision holds.

If it is decided before long that the shift has entered the latter stage, the accumulator back pressure of the brake $B_3$ is gradually increased at Step 206. As a result, the oil pressure to the brake $B_3$ is gradually raised.

At Step 207, moreover, the accumulator back pressure of the brake $B_2$ is gradually increased. As a result, both the brakes $B_2$ and $B_3$ have their oil pressures gradually raised. The turbine revolution number $N_t$ still continues to increase to the synchronized revolution number ($=N_o \times i_2$) until it exceeds the value which is computed by subtracting a predetermined value $\Delta N_{t2}$ (smaller than $\Delta N_{t1}$ and close to 0) from the synchronized revolution number of $N_o \times i_2$.

At this time, therefore, it is decided that the member (i.e., the turbine in this case) has reached the synchronized revolution number. The reason for the subtraction of the predetermined value $\Delta N_{t2}$ is to consider the errors in the sensor system and the delay in the response of the oil pressure control system.

If it is decided at Step 208 that the turbine revolution number $N_t$ has reached the synchronized revolution number ($=N_o \times i_2$), the routine advances to Step 209, at which the accumulator back pressure of the brake $B_3$ is drastically raised to engage the brake $B_3$ completely. At Step 210, on the other hand, the accumulator back pressure of the brake $B_2$ is dropped again to disengage the brake $B_2$ again.

At Step 211, it is decided whether or not the oil pressure of the brake $B_2$ has reached its minimum. IF YES, the entire control flow is ended.

Figure 5:
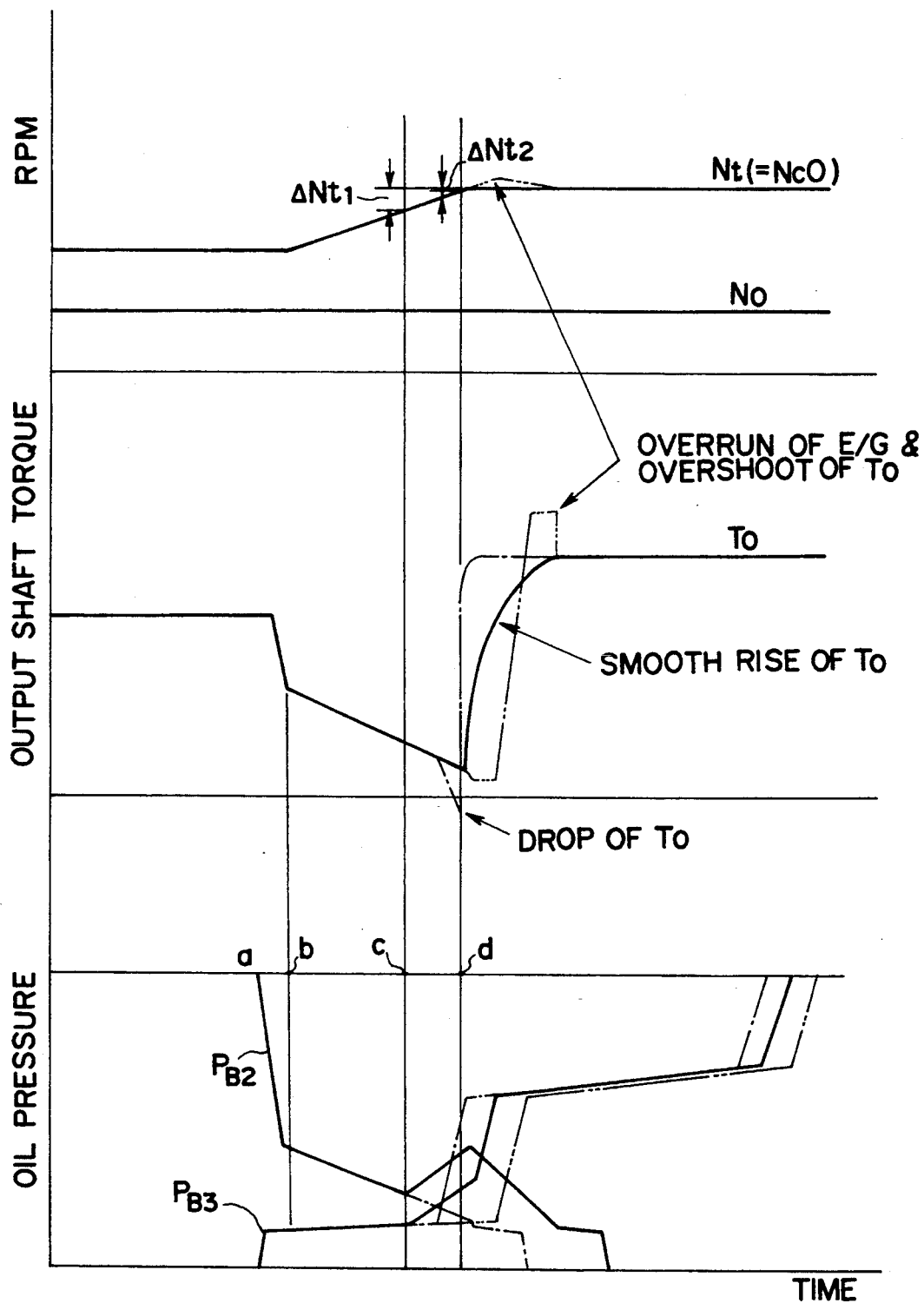
FIG. 5 is a diagram illustrating changes in a turbine R.P.M. and an output shaft torque, and in the oil pressures of brakes $B_2$ and $B_3$.

The shifting transient characteristics for executing the control flow described above are illustrated in FIG. 5. In FIG. 5, points a, b, c and d respectively indicate the instants when the shift command is outputted, when the brake $B_2$ starts to slip, when the latter shift stage is detected, and when it is decided that the turbine revolution number $N_t$ has reached the synchronized revolution number. By controlling the accumulator back pressure, the oil pressure $P_{B2}$ to the brake $B_2$ and the oil pressure $P_{B3}$ to the brake $B_3$ are changed, as illustrated, so that the output shaft torque is changed, as indicated by solid curve, to establish the excellent shifting characteristics.

Specifically, when the shift is started with both the drop of the oil pressure $P_{B2}$ of the brake $B_2$ and the rise of the oil pressure $P_{B3}$ of the brake $B_3$, the output shaft torque drops to start the inertia phase, in which the drop ratio of the output shaft torque is small because the brake $B_2$ starts to slip. At the instant c, moreover, when the turbine revolution number $N_t$ rises to exceed the value ($=N_o \times i_2 - \Delta N_{t1}$), the oil pressure $P_{B2}$ of the brake $B_2$ rises. The rising ratio of the oil pressure $P_{B3}$ of the brake $B_3$ is substantially equal in the example of FIG. 5. Immediately after the turbine revolution number $N_t$ has reached the value ($=N_o \times i_2 - \Delta N_{t2}$), that is, if the synchronized revolution number is detected, the oil pressure $P_{B2}$ of the brake $B_2$ is dropped again, and the oil pressure $P_{B3}$ of the brake $B_3$ is abruptly increased. Simultaneously with this, the output shaft torque To smoothly increases.

On the contrary, if the increase in the oil pressure $P_{B3}$ of the brake $B_3$ is delayed without any temporary increase in the oil pressure $P_{B2}$ of the brake $B_2$ at the latter shift stage, the engine has its revolution number abruptly or excessively increased to its overrun, as indicated by double-dotted curve. In case the rise of the oil pressure $P_{B3}$ of the brake $B_3$ is premature, the output shaft torque To temporarily drops to a large extent, as indicated by single-dotted curve. According to the system of the present invention, however, the disadvantages described above are eliminated.

What is claimed is:

1. An oil pressure control system for an automatic transmission for executing a downshift by disengaging a first frictional engagement element and engaging a second frictional engagement element, comprising:

downshift decide means for deciding that said downshift should be executed:

first oil pressure control means for decreasing an oil pressure of said first frictional engagement element and increasing an oil pressure of said second frictional engagement element when said downshift should be executed;

first condition decide means for deciding that a predetermined first condition is satisfied after a start of a downshift;

oil pressure raise means for gradually raising the oil pressure of said first frictional engagement element and increasing a rising rate of the oil pressure of said second frictional engagement element when it is decided that said first condition is satisfied;

second condition decide means for deciding that a second condition is satisfied; and second oil pressure control means for decreasing the oil pressure of said first frictional engagement element gradually and further increasing the rising rate of the oil pressure of said second frictional engagement element.

2. An oil pressure control system according to claim 1, wherein said first condition decide means includes means for detecting the shift latter stage of said downshift, and wherein said second condition decide means includes means for detecting the synchronism between the rotations of predetermined two rotational members.

3. An oil pressure control system according to claim 1, wherein said first condition decide means includes means for deciding that the difference between an input R.P.M. of the automatic transmission and the revolution number computed by multiplying an output R.P.M. by a gear ratio after said downshift is no more than a predetermined first reference value, and wherein said second condition decide means includes means for deciding that said difference is no more than a predetermined second reference value smaller than said reference value.

4. An oil pressure control system according to claim 1, wherein said oil pressure raise means includes means for setting both the rising rate of the oil pressure of said first frictional engagement element and the rising rate of the oil pressure of said second frictional engagement element to substantially equal values.

* * * * *